United States Patent
Lee et al.

(10) Patent No.: US 10,080,223 B2
(45) Date of Patent: Sep. 18, 2018

(54) METHOD FOR CONFIGURING TRANSMISSION TIME INTERVAL BUNDLING AT A USER EQUIPMENT WITH MULTIPLE CARRIERS AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 15/037,233

(22) PCT Filed: Jan. 20, 2015

(86) PCT No.: PCT/KR2015/000557
§ 371 (c)(1),
(2) Date: May 17, 2016

(87) PCT Pub. No.: WO2015/111891
PCT Pub. Date: Jul. 30, 2015

(65) Prior Publication Data

US 2016/0302198 A1   Oct. 13, 2016

Related U.S. Application Data

(60) Provisional application No. 61/929,924, filed on Jan. 21, 2014.

(51) Int. Cl.
*H04W 72/04* (2009.01)
*H04W 76/02* (2009.01)
(Continued)

(52) U.S. Cl.
CPC ....... *H04W 72/0446* (2013.01); *H04L 1/1861* (2013.01); *H04L 1/1864* (2013.01);
(Continued)

(58) Field of Classification Search
None
See application file for complete search history.

(56) References Cited

U.S. PATENT DOCUMENTS 8,542,654 B1 *  9/2013  Dinan ............... H04W 56/0005
                                                    370/331
9,363,820 B2 *  6/2016  Wang .................... H04W 72/10
(Continued)

FOREIGN PATENT DOCUMENTS

CN      103229545 A       7/2013
EP      2809017 A1 * 12/2014   ........... H04L 5/0053
(Continued)

OTHER PUBLICATIONS

Samsung, "Voice support in inter-ENB carrier aggregation," 3GPP TSG-RAN WG2 Meeting #84, R2-133864, San Francisco, USA, Nov. 11-15, 2013, pp. 1-2.
(Continued)

*Primary Examiner* — Candal Elpenord
(74) *Attorney, Agent, or Firm* — Birch, Stewart, Kolasch & Birch, LLP

(57) ABSTRACT

The present invention relates to a wireless communication system. More specifically, the present invention relates to a method and a device for configuring TTI bundling at a UE with multiple carriers in the a wireless communication system, the method comprising: con-figuring a first cell with configured uplink belonging to a first base station (BS), wherein the first cell is configured with TTI (Transmission Time Interval) bundling enabled; receiving a message for configuring a second cell with configured uplink belonging
(Continued)

to a second BS; and configuring the second cell in accordance with the message, keeping using TTI bundling for the first cell, if the first BS and the second BS are different.

8 Claims, 12 Drawing Sheets

(51) Int. Cl.
*H04L 1/18* (2006.01)
*H04W 76/18* (2018.01)
*H04B 7/26* (2006.01)

(52) U.S. Cl.
CPC ....... *H04W 72/0413* (2013.01); *H04W 76/18* (2018.02); *H04B 7/2656* (2013.01); *H04L 1/1812* (2013.01); *H04L 1/1822* (2013.01)

(56) References Cited

U.S. PATENT DOCUMENTS

| | | | | |
|---|---|---|---|---|
| 9,661,533 | B2 * | 5/2017 | Van Lieshout | H04W 36/0083 |
| 9,924,521 | B2 * | 3/2018 | Heo | H04W 72/082 |
| 2011/0280212 | A1 * | 11/2011 | Lv | H04W 74/002 |
| | | | | 370/329 |
| 2011/0312316 | A1 * | 12/2011 | Baldemair | H04L 5/001 |
| | | | | 455/422.1 |
| 2012/0147830 | A1 * | 6/2012 | Lohr | H04W 72/042 |
| | | | | 370/329 |
| 2012/0213207 | A1 * | 8/2012 | Jang | H04W 24/10 |
| | | | | 370/336 |
| 2012/0320842 | A1 | 12/2012 | Jeong et al. | |
| 2014/0293843 | A1 * | 10/2014 | Papasakellariou | H04W 72/042 |
| | | | | 370/280 |

FOREIGN PATENT DOCUMENTS

| | | |
|---|---|---|
| EP | 2809017 A1 | 12/2014 |
| JP | 2013-197944 A | 9/2013 |
| WO | WO2012/073939 A1 | 6/2012 |
| WO | WO 2013/141269 A1 | 9/2013 |

OTHER PUBLICATIONS

Asustek, "Physical Layer Impacts of Dual Connectivity for Small Cell Enhancement," R1-133565, 3GPP TSG RAN WG1 Meeting #74, Aug. 19-23, 2013, pp. 1-3.
ETRI, "Physical Layers Aspects of Dual Connectivity," R1-133182, 3GPP TSG RAN WG1 Meeting #74, Aug. 19-23, 2013, pp. 1-4.
Intel Corporation, "UL Control Enhancements for Small Cell Environments," R-132937, 3GPP TSG RAN WG1 Meeting #74, Aug. 19-23, 2013, pp. 1-4.
ZTE, "Physical Layer Aspects of Dual Connectivity," R1-133075, 3GPP TSG RAN WG1 Meeting #74, Aug. 19-23, 2013, pp. 1-3.
Interdigital Communications, "MAC Aspects of Dual Connectivity," 3GPP TSG-RAN WG2 #83bis, R2-133236, Ljubljana, Slovenia, Oct. 7-11, 2013 (downloaded by EPO on Sep. 28, 2013), pp. 1-5.

* cited by examiner

FIG. 3
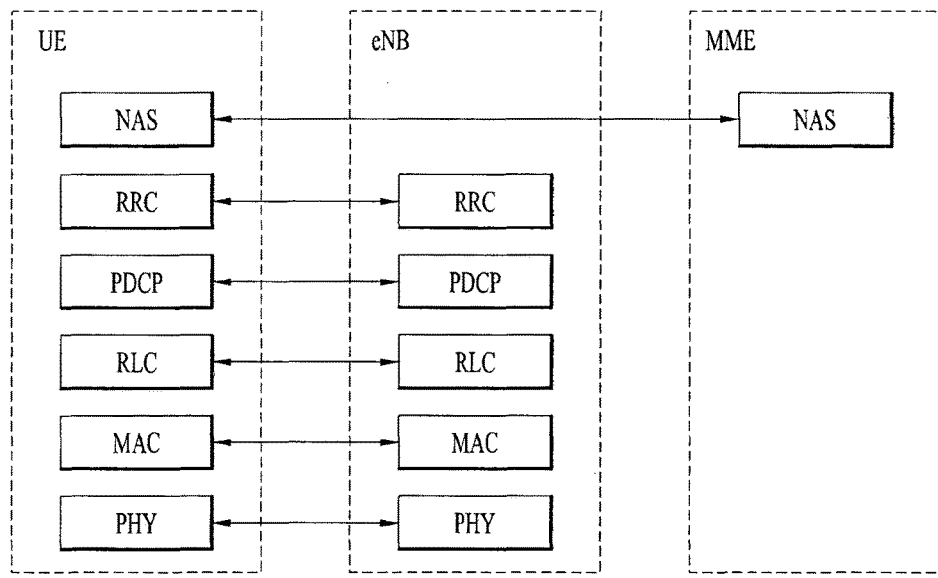
(a) Control-Plane Protocol Stack
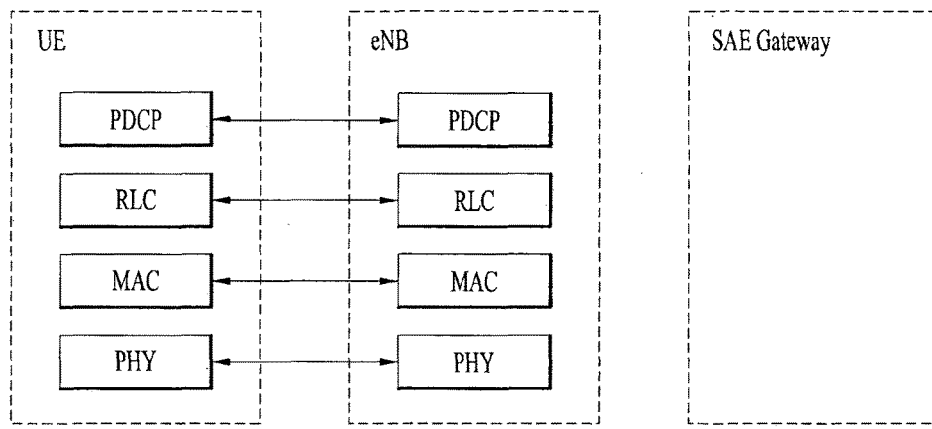
(b) User-Plane Protocol Stack Component carrier 5 component carriers → 100 MHz (a) C-Plane connectivity of eNBs involved in dual connectivity (b) U-Plane connectivity of eNBs involved in dual connectivity

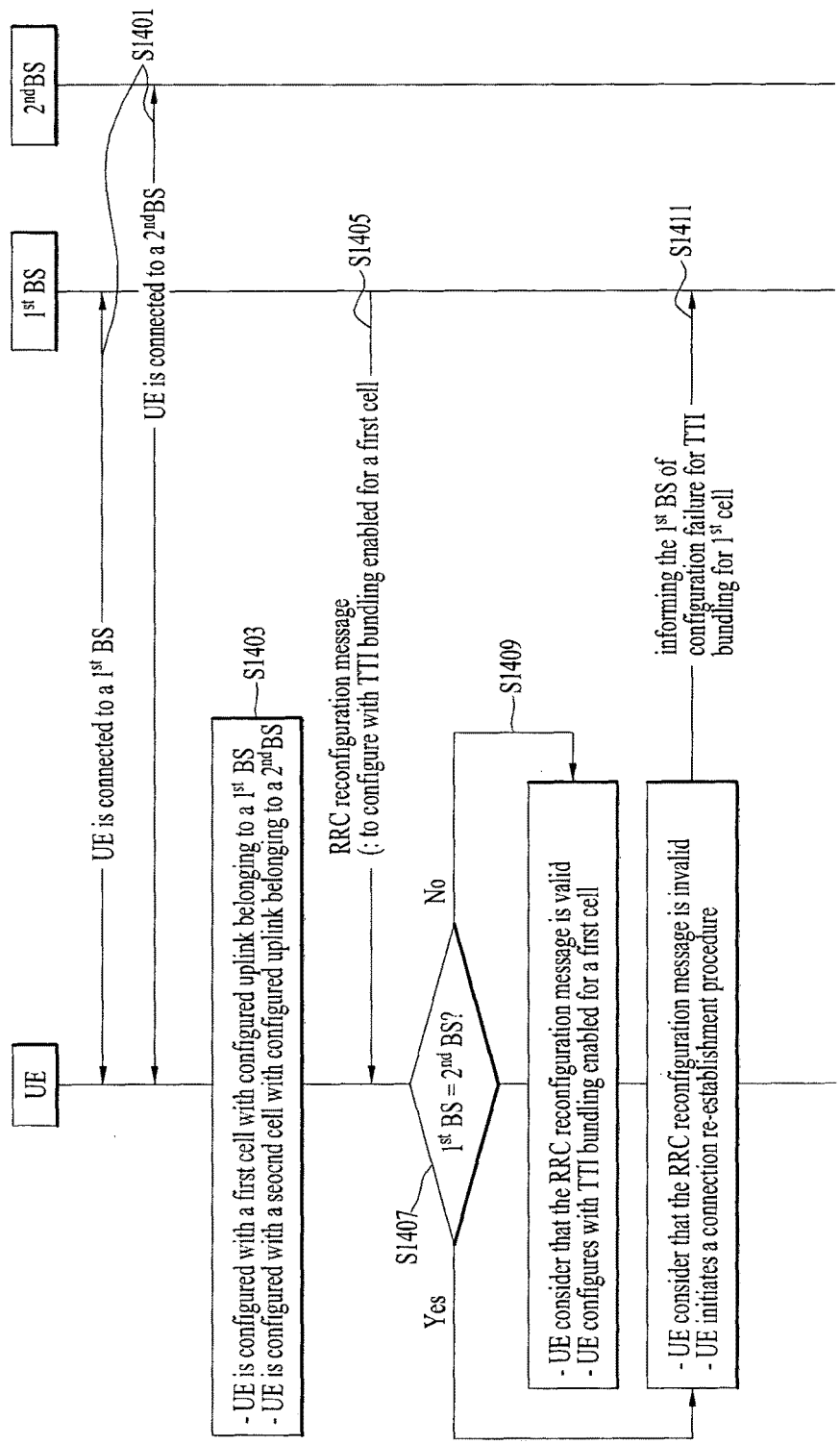

METHOD FOR CONFIGURING TRANSMISSION TIME INTERVAL BUNDLING AT A USER EQUIPMENT WITH MULTIPLE CARRIERS AND DEVICE THEREFOR

CROSS REFERENCE TO RELATED APPLICATIONS

This application is the National Phase of PCT International Application No. PCT/KR2015/000557, filed on Jan. 20, 2015, which claims priority under 35 U.S.C. 119(e) to U.S. Provisional Application No. 61/929,924, filed on Jan. 21, 2014, all of which are hereby expressly incorporated by reference into the present application.

TECHNICAL FIELD

The present invention relates to a wireless communication system and, more particularly, to a method for configuring TTI bundling at a UE with multiple carriers and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for configuring TTI bundling with multiple carriers. The technical problems solved by the present invention are not limited to the above technical problems and those skilled in the art may understand other technical problems from the following description.

Technical Solution

The object of the present invention can be achieved by providing a method for a User Equipment (UE) operating in a wireless communication system, the method comprising: configuring a first cell with configured uplink belonging to a first base station (BS), wherein the first cell is configured with TTI (Transmission Time Interval) bundling enabled; receiving a message for configuring a second cell with configured uplink belonging to a second BS; and configuring the second cell in accordance with the message, keeping using TTI bundling for the first cell, if the first BS and the second BS are different.

In another aspect of the present invention, provided herein is a UE (User Equipment) for performing random access procedure in a wireless communication system, the UE comprising: an RF (Radio Frequency) module; and a processor configured to control the RF module, wherein the processor is configured to configure a first cell with configured uplink belonging to a first base station (BS), wherein the first cell is configured with TTI (Transmission Time Interval) bundling enabled, to receive a message for configuring a second cell with configured uplink belonging to a second BS, and to configure the second cell in accordance with the message, keeping using TTI bundling for the first cell, if the first BS and the second BS are different.

Meanwhile, In another aspect of the present invention, provided herein is a method for a User Equipment (UE) operating in a wireless communication system, the method comprising: configuring a first cell with configured uplink belonging to a first base station (BS) and a second cell with configured uplink belonging to a second BS; receiving a message for configuring TTI (Transmission Time Interval) bundling for the first cell; and configuring the TTI bundling for the first cell in accordance with the message, if the first BS and the second BS are different.

In another aspect of the present invention, provided herein is a UE (User Equipment) for performing random access procedure in a wireless communication system, the UE comprising: an RF (Radio Frequency) module; and a processor configured to control the RF module, wherein the processor is configured to configure a first cell with configured uplink belonging to a first base station (BS) and a second cell with configured uplink belonging to a second BS, to receiving a message for configuring TTI (Transmission Time Interval) bundling for the first cell, and to configure the TTI bundling for the first cell in accordance with the message, if the first BS and the second BS are different.

Preferably, the method further comprises: initiating a connection re-establishment procedure if the first BS and the second BS are same; and informing the first BS of configuration failure for the second cell regarding the message.

Preferably, the method further comprises: configuring the second cell in accordance with the message, if the first BS and the second BS are same, releasing configuration of the TTI bundling for the first cell; and informing the first BS of disabling the TTI bundling for the first cell.

Preferably, the message comprises a cell identifier and a BS identifier that indicates to which BS the cell is belonging.

It is to be understood that both the foregoing general description and the following detailed description of the present invention are exemplary and explanatory and are intended to provide further explanation of the invention as claimed.

Advantageous Effects

According to the present invention, TTI bundling configuration can be efficiently transmitted in a multiple carrier aggregation system. It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

FIGS. 13 and 14 are conceptual diagrams for configuring TTI bundling at a UE with multiple carriers according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
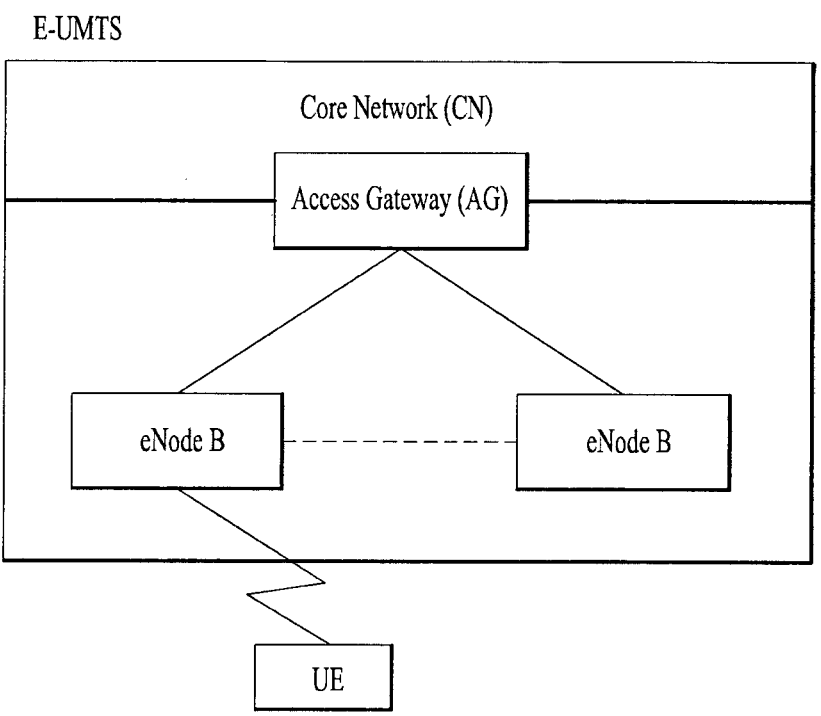
FIG. 1 is a diagram showing a network structure of an Evolved Universal Mobile Telecommunications System (E-UMTS) as an example of a wireless communication system.
Figure 2A:
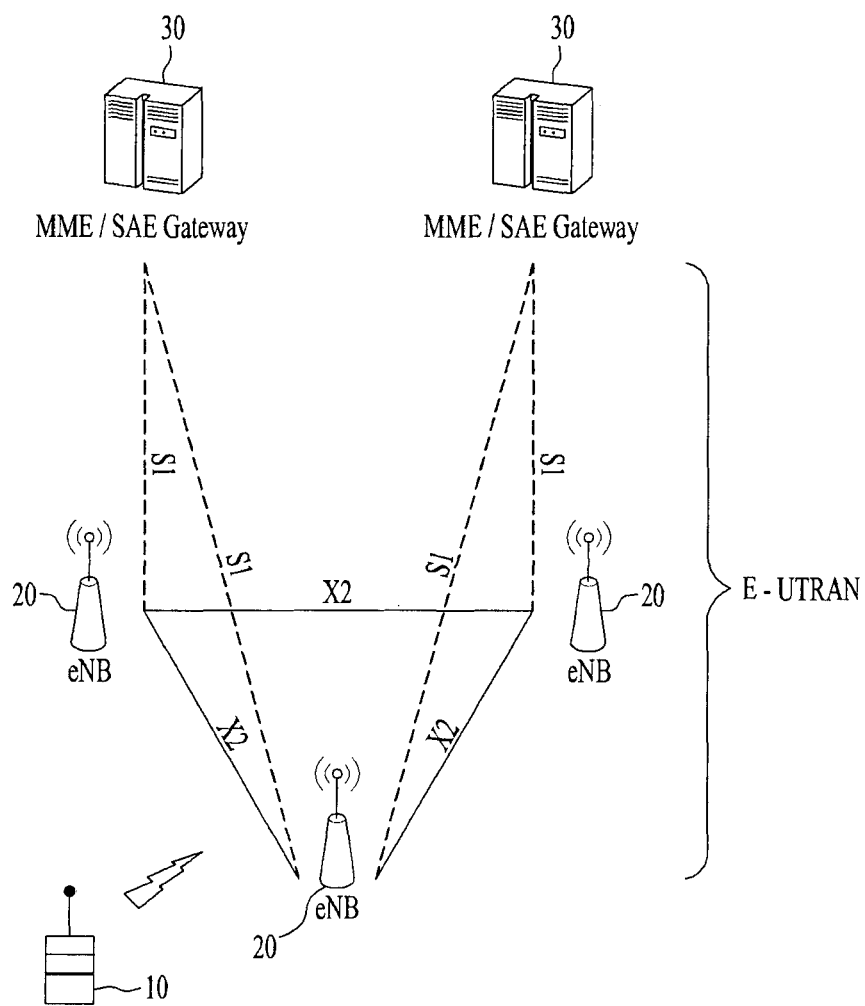
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
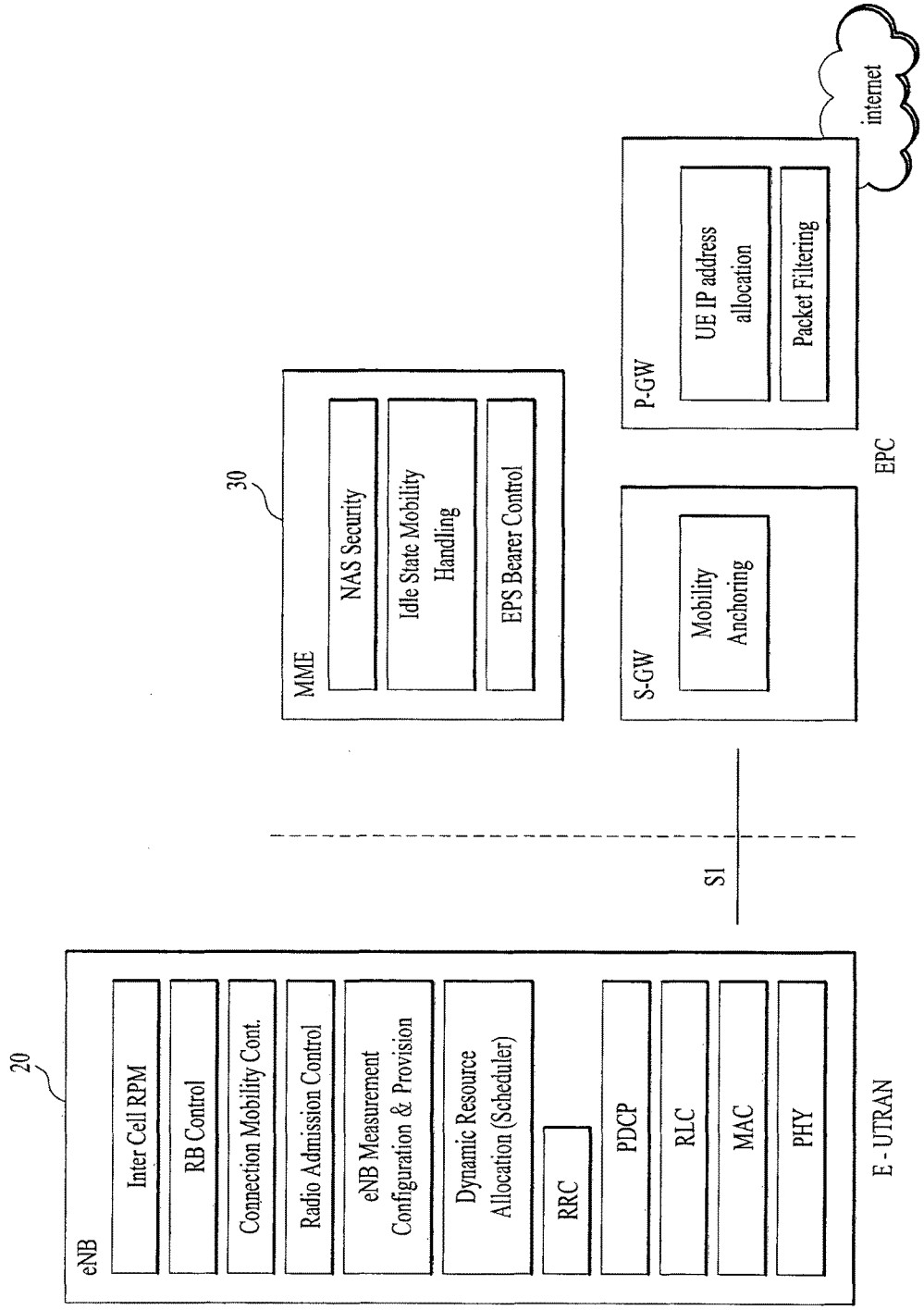
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
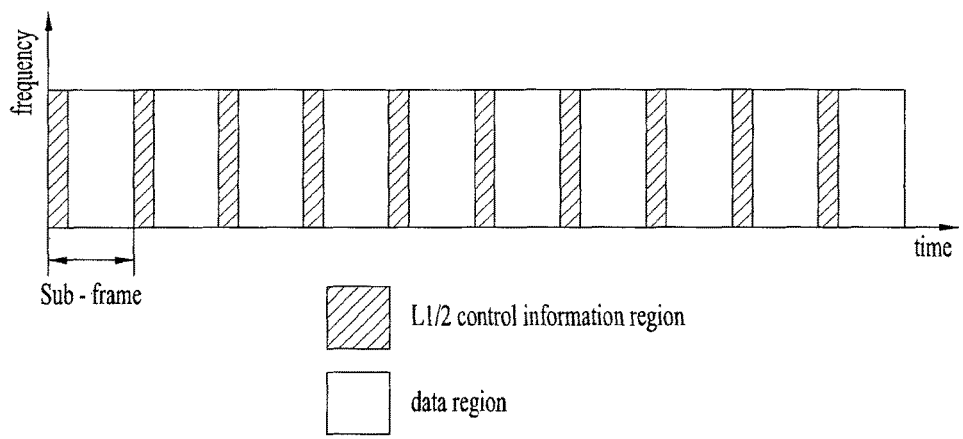
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
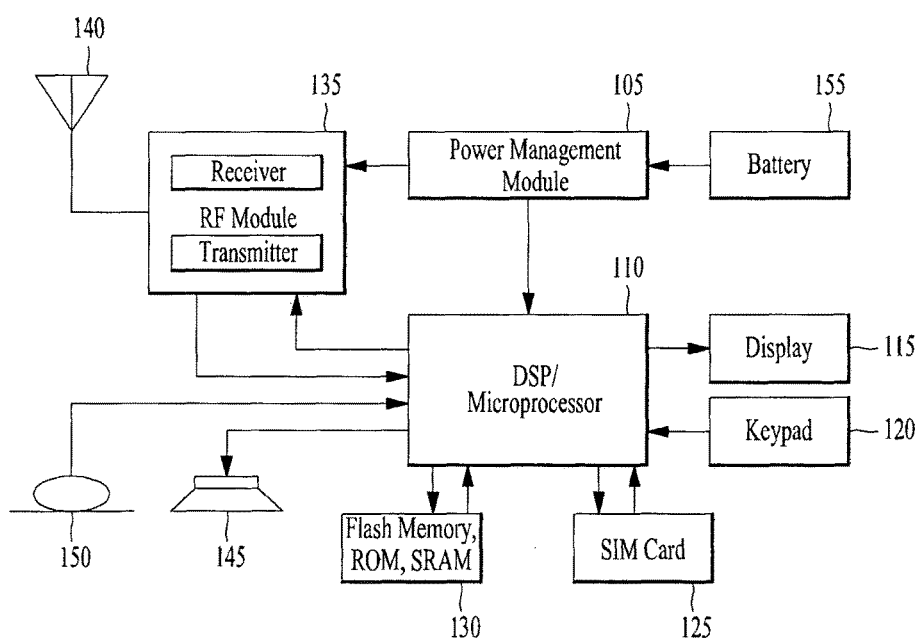
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
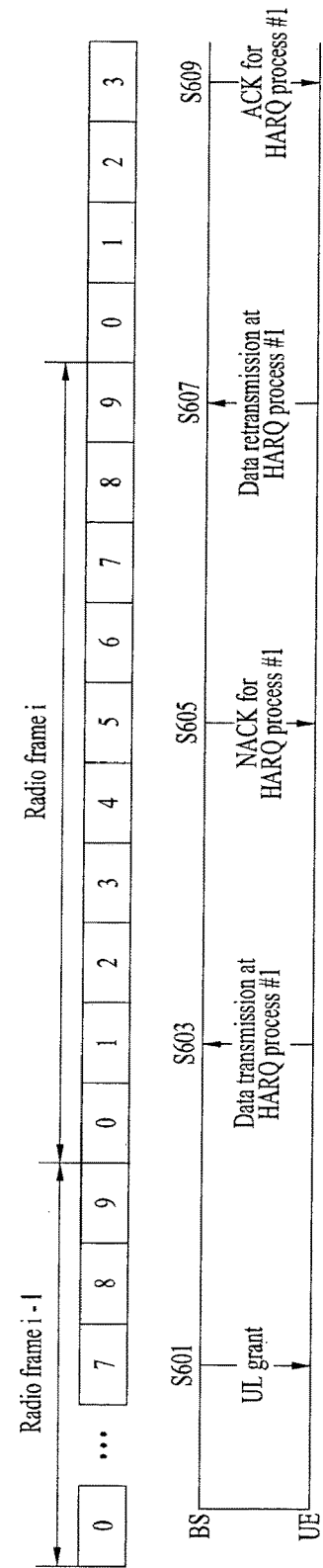
FIG. 6 is a conceptual diagram illustrating an exemplary synchronous non-adaptive UL HARQ operation.

FIG. 6 is a conceptual diagram illustrating an exemplary synchronous non-adaptive UL HARQ operation;

Referring to FIG. 6, a user equipment (UE) has a plurality of HARQ processes, and the HARQ processes may operate in a synchronous manner. That is, each HARQ process may be allocated to each TTI in a synchronous manner. For example, the LTE system assumes that the UE has 8 HARQ processes. As a result, HARQ process #1 may be allocated to the first TTI, HARQ process #2 may be allocated to the second TTI, . . . HARQ process #8 may be allocated to the 8th TTI, HARQ process #1 may be allocated to a 9th TTI, and HARQ process #2 may be allocated to the 10th TTI. For example, if a PDCCH including a UL grant is detected at a specific TTI, the HARQ entity can identify the HARQ process in which data transmission should be carried out, and can transfer UL grant information to the identified HARQ process. For example, as can be seen from FIG. 6, if the HARQ process associated with Subframe #7 of a radio frame (i−1) having received the UL grant is set to 1, UL data may be transmitted at HARQ process #1 at Subframe #1 of the radio frame (i) and may be retransmitted at HARQ process #1 at Subframe #9 of the radio frame (i) after lapse of 8 subframes. In a synchronous HARQ operation, if the HARQ process associated with one TTI is identified, it can be recognized that the same HARQ process is associated at the corresponding TTI (TTI+8). If a certain HARQ process is associated with one TTI during the synchronous HARQ operation unless otherwise mentioned, it is assumed that the same HARQ process is associated with the 8th, 16th, and 24th TTIs after lapse of the corresponding TTI.

In step S601, the BS (or eNB) may transmit a UL grant to the UE, such that the UE may flush a Tx buffer and store new UL data in the Tx buffer. In step S603, the UE may transmit UL data to the BS (or eNB) at HARQ process #1 on the basis of resources and MCS information in response to the UL grant received at step S601. In this example, it is assumed that UL data received by the BS (or eNB) fails in decoding, such that the BS (or eNB) may transmit the NACK message in response to UL data in step S605. Upon receiving the NACK message from the BS (or eNB), the UE may retransmit the previously transmitted UL data in step S607. In this case, retransmission may be carried out at HARQ process #1 in which UL data transmission has been carried out at step S603, and the retransmission may be carried out at intervals of 8 msec. That is, a time point at which retransmission is carried out is not separately designated, and the retransmission is carried out at intervals of a predetermined time, such that this operation may correspond to a synchronous HARQ operation. In addition, the UE having received the NACK message may apply resources, MCS level, etc. designated by the previously received UL grant to retransmission without change, without receiving a separated UL grant. That is, new scheduling information for retransmission is not given, and may correspond to the non-adaptive HARQ operation. The BS having received the retransmitted UL data combines the retransmitted UL data with the previously received data, and attempts to decode the combined result. In this example, it is assumed that the BS succeeds in reception and decoding of UL data. In this case, the BS may transmit the ACK message to the UE in step S609. Although FIG. 6 assumes a uplink (UL) situation in which the UE is a data transmitter, the BS is a data receiver, and the UE receives HARQ feedback information from the UE for convenience of description and better understanding of the present invention, the HARQ operation may be carried out even in the case in which the BS transmits DL data and the UE feeds back ACK/NACK information.

The HARQ scheme may be classified into a synchronous scheme and an asynchronous scheme on the basis of a retransmission time. In accordance with the synchronous HARQ scheme, if initial transmission failure occurs, subsequent retransmission may be carried out at a specific time decided by the system as the above FIG. 6. On the contrary, according to the asynchronous HARQ scheme, information regarding the retransmission time may be scheduled separately. Therefore, the retransmission time of the packet corresponding to the NACK signal may be changed by various conditions such as a channel state, etc.

In LTE(-A) system, when the UE transmit UL data to the BS (in case of UL HARQ process), the BS may transmit ACK/NACK signals at the certain time point and re-transmission is carried out at intervals of a predetermined time, such that this operation may correspond to a synchronous HARQ operation. On the other hand, when the BS transmits DL data to the UE (in case of DL HARQ process), the UE may transmit ACK/NACK signals based on information included in the DCI indicating an asynchronous DL HARQ operation.

Regarding the formats of control information, control information transmitted on a PDCCH is called DCI. The configuration of information carried in PDCCH payload may be changed depending on DCI format. The PDCCH payload is information bits. Table 1 lists DCI according to DCI formats.

TABLE 1

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 1, the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of transmission power control (TPC) commands for uplink channels. DCI Format 1A is available for PDSCH scheduling irrespective of the transmission mode of a UE.

Especially, DCI format 1 used for the scheduling of one PDSCH includes the following information. Table 2 lists the information included on the DCT format 1.

TABLE 2

| Information | bits |
| --- | --- |
| Resource allocation header | 1 bit |
| Resource block assignment | $\lceil N_{RB}^{DL}/P \rceil$ bits or ($\lceil N_{RB}^{DL}/P \rceil - \lceil \log_2(P) \rceil - 1$) bits |

TABLE 2-continued

| Information | bits |
| --- | --- |
| Modulation and coding scheme | 5 bits |
| HARQ process number | 3 bits (FDD), 4 bits (TDD) |
| New data indicator | 1 bit |
| Redundancy version | 2 bits |
| TPC command for PUCCH | 2 bits |
| Downlink Assignment Index | 2 bits |

Referring to Table 2, in case of a DL HARQ process, the DCI transmitted via the format 1 explicitly indicates HARQ process number. In according to the asynchronous HARQ scheme, the transmission of the ACK/NACK signal and the retransmission time of the packet corresponding to the NACK signal may be configured by the information regarding to the HARQ process number.

Figure 7:
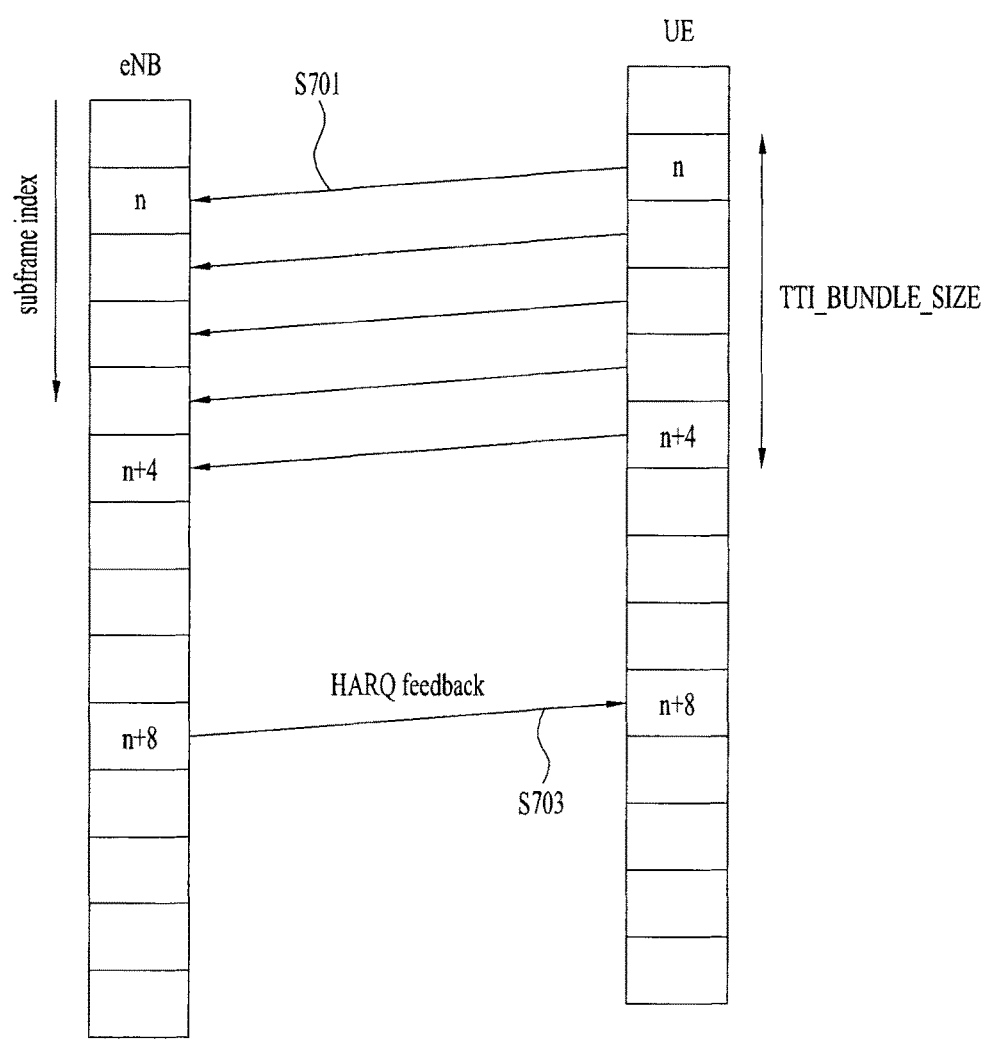
FIG. 7 is a diagram for TTI bundling in HARQ operation.

FIG. 7 is a diagram for TTI bundling in HARQ operation.

When a UE is in a bad coverage of a cell, the UE cannot increase the transmission power as the UE is limited in power point of view. Thus, when the UE is near to the cell edge and using a real time services such as VoIP, there should be a method to enhance the uplink coverage.

One of methods for enhancing the uplink coverage is a TTI bundling in HARQ operation. TTI Bundling is LTE feature to improve coverage at cell edge or in poor radio conditions. UE has limited power in uplink (only 23 dBm for LTE) which can result in many re transmissions at cell edge (poor radio). Re-transmission means delay and control plan overhead which may not be acceptable for certain services like VoIP. To understand TTI bundling one need to have the basic idea of Hybrid Automatic Repeat Request (HARQ) and Transmission Time interval (TTI).

HARQ process is already described as above mentioned, the TTI is LTE smallest unit of time in which eNB is capable of scheduling any user for uplink or downlink transmission. If a user is receiving downlink data, then during each 1 ms, eNB will assign resources and inform user where to look for its downlink data through PDCCH channel. Check the following figure to understand the concept of TTI There is one HARQ entity at the UE for each Serving Cell with configured uplink, which maintains a number of parallel HARQ processes allowing transmissions to take place continuously while waiting for the HARQ feedback on the successful or unsuccessful reception of previous transmissions. When the physical layer is configured for uplink spatial multiplexing, there are two HARQ processes associated with a given TTI. Otherwise there is one HARQ process associated with a given TTI.

At a given TTI, if an uplink grant is indicated for the TTI, the HARQ entity identifies the HARQ processes for which a transmission should take place. It also routes the received HARQ feedback (ACK/NACK information), MCS and resource, relayed by the physical layer, to the appropriate HARQ processes.

Regarding FIG. 7, when TTI bundling is configured, the parameter TTI_BUNDLE_SIZE provides the number of TTIs of a TTI bundle. TTI bundling operation relies on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE (701). The HARQ feedback of a bundle is only received for the last TTI of the bundle (i.e the TTI corresponding to TTI_BUNDLE_SIZE), regardless of whether a transmission in that TTI takes place or not (e.g. when a measurement gap occurs) (S703).

The TTI bundling procedure is configured through an RRCConnectionReconfiguration message.

The RRCConnectionReconfiguration message is the command to modify an RRC connection. It may convey information for measurement configuration, mobility control, radio resource configuration (including RBs, MAC main configuration and physical channel configuration) including any associated dedicated NAS information and security configuration. A signaling radio bearer for which the RRCConnectionReconfiguration message is transmitted is SRB 1, a logical channel is DCCH and direction of which the RRCConnectionReconfiguration message is transmitted E-UTRAN to UE.

The RRCConnectionReconfiguration message includes following information.

<RRCConnectionReconfiguration>

```
--ASN1START

RRCConnectionReconfiguration ::= SEQUENCE {
    rrc-TransactionIdentifier          RRC-TransactionIdentifier,
    criticalExtensions                 CHOICE {
        c1                             CHOICE {
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture       SEQUENCE { }
    }
}

RRCConnectionReconfiguration-r8-IEs ::= SEQUENCE {
    measConfig                         MeasConfig              OPTIONAL,    -- Need ON
    mobilityControlInfo                MobilityControlInfo     OPTIONAL,    -- Cond HO
    dedicatedInfoNASList               SEQUENCE (SIZE(1..maxDRB)) OF
                                       DedicatedInfoNAS        OPTIONAL,    -- Cond nonHO
    radioResourceConfigDedicated       RadioResourceConfigDedicated OPTIONAL, -- Cond HO-toEUTRA
    securityConfigHO                   SecurityConfigHO        OPTIONAL,    -- Cond HO
    nonCriticalExtension               RRCConnectionReconfiguration-v890-IEs OPTIONAL -- Need OP
}
-----------omit---------------------------------------------------------------------------------
```

Information of RadioResourceConfigDedicated is included in the RRCConnectionReconfiguration message. The RadioResourceConfigDedicated is used to setup/modify/release RBs, to modify the MAC main configuration, to modify the SPS configuration and to modify dedicated physical configuration.

The RadioResourceConfigDedicated information includes following elements.

<RadioResourceConfigDedicated>

```
--ASN1START

RadioResourceConfigDedicated ::= SEQUENCE {
    srb-ToAddModList                   SRB-ToAddModList        OPTIONAL,   -- Cond HO-Conn
    drb-ToAddModList                   DRB-ToAddModList        OPTIONAL,   -- Cond HO-toEUTRA
    drb-ToReleaseList                  DRB-ToReleaseList       OPTIONAL,   -- Need ON
    mac-MainConfig                     CHOICE {
        explicitValue                  MAC-MainConfig,
        defaultValue                   NULL
    }                                                          OPTIONAL,   -- Cond HO-toEUTRA2
    sps-Config                         SPS-Config              OPTIONAL,   -- Need ON
    physicalConfigDedicated            PhysicalConfigDedicated OPTIONAL,   -- Need ON
    ...,
    [[ rlf-TimersAndConstants-r9       RLF-TimersAndConstants-r9 OPTIONAL  -- Need ON
    ]],
    [[ measSubframePatternPCell-r10    MeasSubframePatternPCell-r10 OPTIONAL -- Need ON
    ]],
    [[ neighCellsCRS-Info-r11          NeighCellsCRS-Info-r11  OPTIONAL
```

-continued

```
--Need ON"
→ }}"
}"
--------omit--------------------------------------------------------------------------------"
```

Above all, Information of mac-MainConfig is included in the RadioResourceConfigDedicated information element. The mac-MainConfig is used to specify the MAC main configuration for signalling and data radio bearers.

The mac-MainConfig information includes following elements.

<mac-MainConfig information>

```
--ASN1START"

MAC-MainConfig::=→ → → → → SEQUENCE{"
→ ul-SCH-Config → → → → → → SEQUENCE{"
→ → maxHARQ-Tx→ → → → → → → ENUMERATED{"
→ → → → → → → → → → → → n1, n2, n3, n4, n5, n6, n7, n8,"
→ → → → → → → → → → → → n10, n12, n16, n20, n24, n28,"
→ → → → → → → → → → → → spare2, spare1}→ → OPTIONAL, → --Need ON"
→ → periodicBSR-Timer → → → → → ENUMERATED{"
→ → → → → → → → → → → → sf5, sf10, sf16, sf20, sf32, sf40, sf64, sf80,"
→ → → → → → → → → → → → sf128, sf160, sf320, sf640, sf1280, sf2560,"
→ → → → → → → → → → → → infinity, spare1} → OPTIONAL, → --Need ON"
→ → retxBSR-Timer → → → → → → ENUMERATED{"
→ → → → → → → → → → → → sf320, sf640, sf1280, sf2560, sf5120,"
→ → → → → → → → → → → → sf10240, spare2, spare1},"
→ → ttiBundling→ → → → → → BOOLEAN"
→ } → → → → → → → → → → → → → → → → OPTIONAL, ·→ --Need ON"
→ drx-Config→ → → → → → → DRX-Config→ → → → → OPTIONAL, → --Need ON"
→ omit---------------------------------------------------------------------"
```

In conclusion, Information of ttiBundling is included in the mac-MainConfig information element. An indicating of 'Ture' indicates that TTI bundling is enabled. And an indicating of 'FALSE' indicates that TTI bundling is disabled. TTI bundling can be enabled for FDD and for TDD only for configurations 0, 1 and 6. For TDD, E-UTRAN does not simultaneously enable TTI bundling and semi-persistent scheduling in this release of specification. Furthermore, E-UTRAN does not simultaneously configure TTI bundling and SCells with configured uplink.

Figure 8:
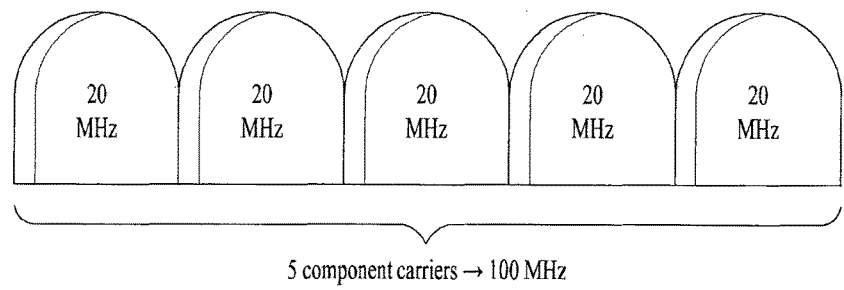
FIG. 8 is a diagram for carrier aggregation.

FIG. 8 is a diagram for carrier aggregation.

Carrier aggregation technology for supporting multiple carriers is described with reference to FIG. 8 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Above mentioned before, the RRCConnectionReconfiguration message is used to modify an RRC connection. If the UE have to add or modify one or more SCells, the RRCConnectionReconfiguration message is used.

The RRCConnectionReconfiguration message further includes following information.
<RRCConnectionReconfiguration> each sCellIndex value included in the sCellToAddModList that is part of the current UE configuration (SCell modification).

Figure 9:
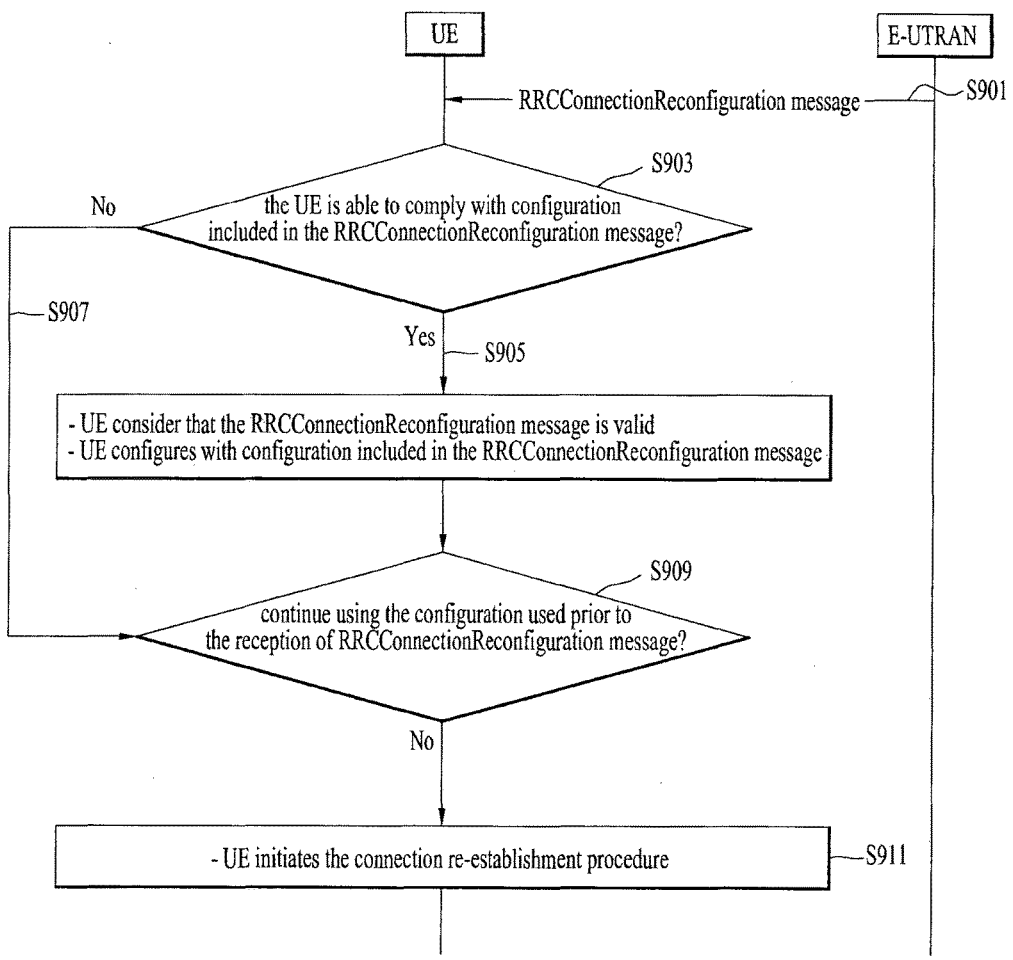
FIG. 9 is a diagram for RRC connection reconfiguration operation.

FIG. 9 is a diagram for RRC connection reconfiguration operation.

When the UE received RRCConnectionReconfiguration message to modify an RRC connection from E-UERAN (S901), the UE determined whether the UE is able to comply with configuration included in the RRCConnectionReconfiguration message or not (S903). If the UE is able to comply with configuration included in the RRCConnectionReconfiguration message, the UE consider that the RRCConnectionReconfiguration message is valid and the UE configures with configuration included in the RRCConnectionReconfiguration message (S905).

If the UE is not able to comply with configuration included in the RRCConnectionReconfiguration message, the UE continues using the configuration used prior to the reception of RRCConnectionReconfiguration message. And perform the actions upon leaving RRC_CONNECTED with release cause other if security has not been activated (S909). Or, the UE initiate the connection re-establishment procedure upon which the connection reconfiguration procedure ends (S911).

The UE shall only initiate the procedure when AS security has been activated. The UE initiates the procedure when one of the following conditions is met: i) upon detecting radio link failure, ii) upon handover failure, iii) upon mobility from E-UTRA failure, iv) upon integrity check failure indication from lower layers; or v) upon an RRC connection reconfiguration failure.

```
RRCConnectionReconfiguration-v1020-IEs•::=•SEQUENCE•{•
→ sCellToReleaseList-r10→ → → → SCellToReleaseList-r10→ → → OPTIONAL, → --•Need•ON•
→ sCellToAddModList-r10→ → → → SCellToAddModList-r10→ → → OPTIONAL, → --•Need•ON•
→ nonCriticalExtension → → → → RRCConnectionReconfiguration-v1130-IEs→ OPTIONAL → --•Need•
OP•
}•

RRCConnectionReconfiguration-v1130-IEs•::=•SEQUENCE•{•
→ systemInfomationBlockType1Dedicated-r11→OCTET•STRING•(CONTAINING•SystemInformationBlockType1)•
→ → → → → → → → → → → → → → → → → → OPTIONAL, → --•Need•ON•
→ nonCriticalExtension → → → → SEQUENCE•{ }→ → → → → → OPTIONAL → --•Need•OP•
}•

SCellToAddModList-r10•::=→ → SEQUENCE•(SIZE•(1..maxSCell-r10))•OF•SCellToAddMod-r10•

SCellToAddMod-r10•::=→ → → SEQUENCE•{•
→ sCellIndex-r10→ → → → → → SCellIndex-r10•
→ cellIdentification-r10→ → → → SEQUENCE•{•
→ → physCellId-r10→ → → → → → PhysCellId,•
→ → dl-CarrierFreq-r10→ → → → → ARFCN-ValueEUTRA•
→ } → → → → → → → → → → → → → → → OPTIONAL, → --•Cond•SCellAdd•
→ radioResourceConfigCommonSCell-r10→ → RadioResourceConfigComnonSCell-r10→OPTIONAL, → --•Cond•
SCellAdd•
→ radioResourceConfigDedicatedSCell-r10 → RadioResourceConfigDedicatedSCell-r10 → OPTIONAL, → --•
Cond•SCellAdd2•
→ ...,•
```

The UE can add the SCell, corresponding to the cellIdentification, in accordance with the received radioResourceConfigCommonSCell and radioResourceConfigDedicatedSCell for each sCellIndex value included in the sCellToAddModList that is not part of the current UE configuration (SCell addition). And the UE can configure lower layers to consider the SCell to be in deactivated state.

Figure 10:
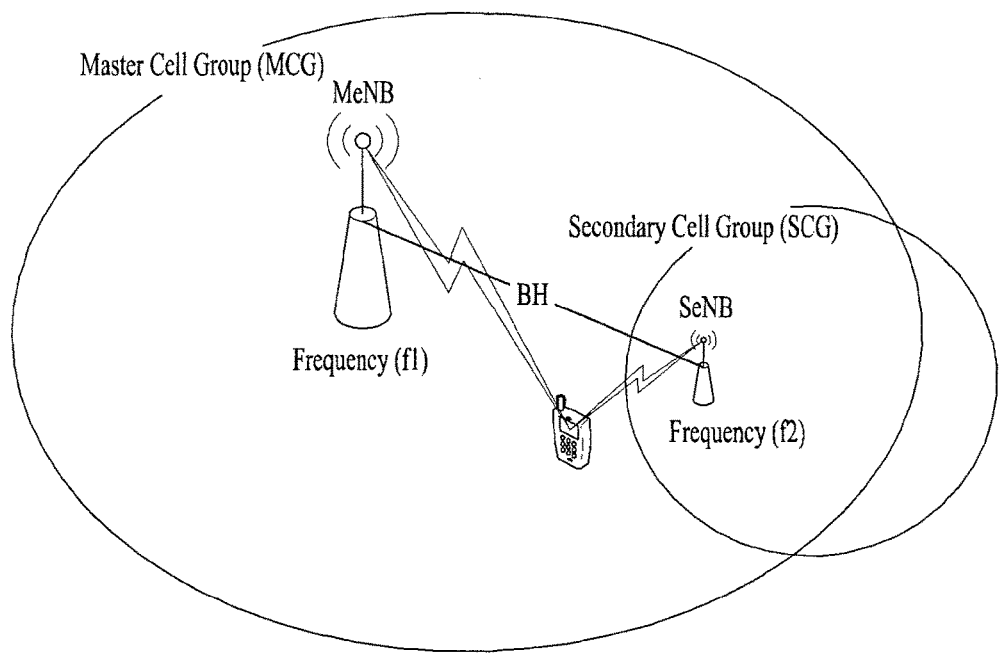
FIG. 10 is a conceptual diagram for dual connectivity between a Master Cell Group (MCS) and a Secondary Cell Group (SCG)

The UE can modify the SCell configuration in accordance with the received radioResourceConfigDedicatedSCell, for FIG. 10 is a conceptual diagram for dual connectivity between a Master Cell Group (MCS) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

The dual connectivity is a kind of carrier aggregation in that the UE is configured a plurality serving cells. However, unlike all serving cells supporting carrier aggregation of FIG. 8 are served by a same eNB, all serving cells supporting dual connectivity of FIG. 10 are served by different eNBs, respectively at same time. The different eNBs are connected via non-ideal backhaul interface because the UE is connected with the different eNBs at same time.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 11A:
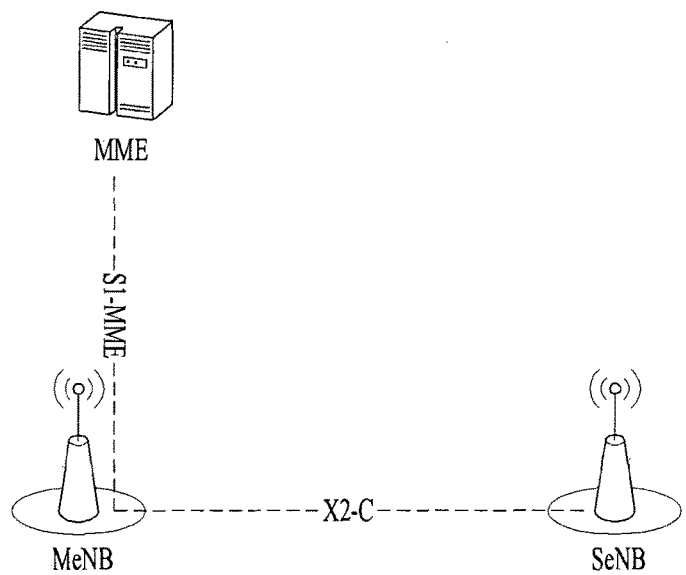
FIG. 11a is a conceptual diagram for C-Plane connectivity of base stations involved in dual connectivity.
Figure 11B:
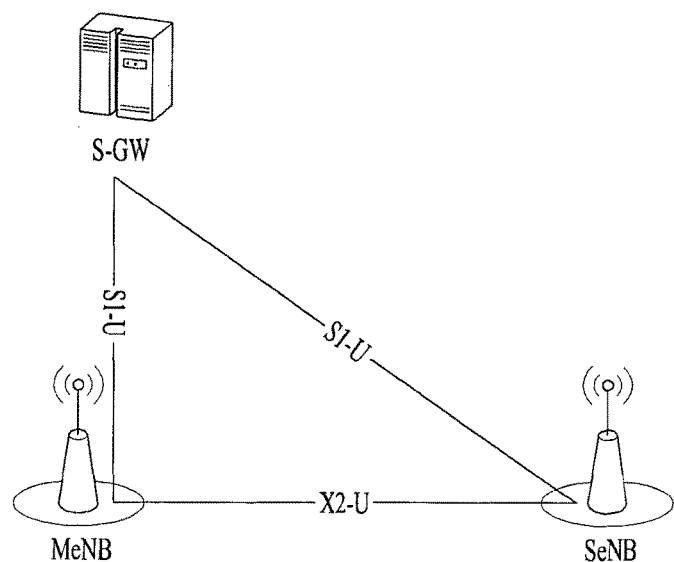
FIG. 11b is a conceptual diagram for U-Plane connectivity of base stations involved in dual connectivity.

FIG. 11a shows C-plane (Control Plane) connectivity of eNBs involved in dual connectivity for a certain UE: The MeNB is C-plane connected to the MME via S1-MME, the MeNB and the SeNB are interconnected via X2-C (X2-Control plane). As FIG. 11a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling FIG. 11b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 12:
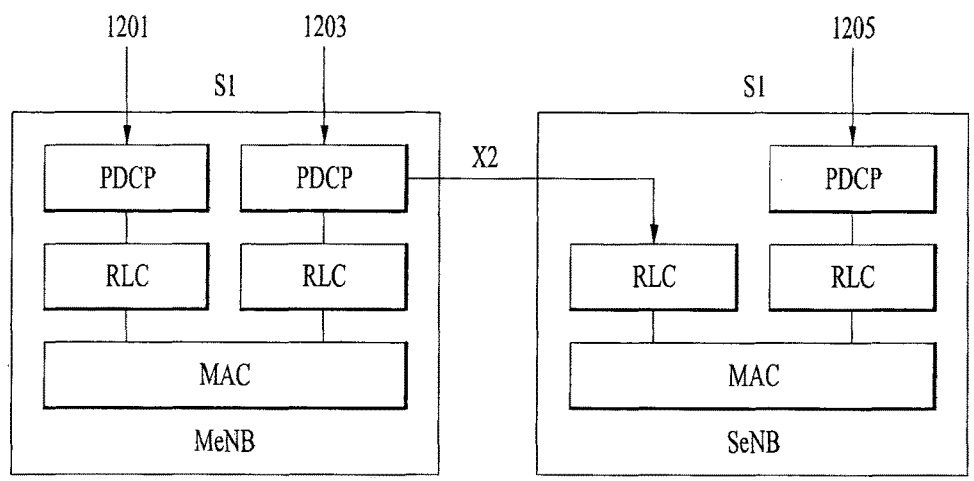
FIG. 12 is a conceptual diagram for radio protocol architecture for dual connectivity.

FIG. 12 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (1201), split bearer (1203) and SCG bearer (1205). Those three alternatives are depicted on FIG. 12. The SRBs (Signaling Radio Bearers) are always of the MCG bearer and therefore only use the radio resources provided by the MeNB. The MCG bearer (1201) is a radio protocol only located in the MeNB to use MeNB resources only in the dual connectivity. And the SCG bearer (1205) is a radio protocol only located in the SeNB to use SeNB resources in the dual connectivity.

Specially, the split bearer (1203) is a radio protocol located in both the MeNB and the SeNB to use both MeNB and SeNB resources in the dual connectivity and the split bearer (1203) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

In Dual Connectivity, two MAC entities are configured in the UE: one for the MCG and one for the SCG. Each MAC entity is configured by RRC with a serving cell supporting PUCCH transmission and contention based Random Access. The term SpCell refers to such cell, whereas the term SCell refers to other serving cells. The term SpCell either refers to the PCell of the MCG or the PSCell of the SCG depending on if the MAC entity is associated to the MCG or the SCG, respectively. A Timing Advance Group containing the SpCell of a MAC entity is referred to as pTAG, whereas the term sTAG refers to other TAGs.

The functions of the different MAC entities in the UE operate independently if not otherwise indicated. The timers and paramenters used in each MAC entity are configured independently if not otherwise indicated. The Serving Cells, C-RNTI, radio bearers, logical channels, upper and lower layer entities, LCGs, and HARQ entities considered by each MAC entity refer to those mapped to that MAC entity if not otherwise indicated The TTI bundling, above mentioned before, is for the UE with limited uplink transmission power to increase the uplink coverage, i.e., mainly for the UE near to the edge of a cell. Carrier aggregation (CA) is for the UE to increase the throughput, i.e., typically for the UE in good coverage of a cell. Consequently, it is not likely that TTI bundling and CA are used at the same time. In addition, if TTI bundling is supported for multiple cells, HARQ operation becomes complex because the SCells can be dynamically activated/deactivated. Therefore, in the current MAC specification, it is said, TTI bundling is not supported when the UE is configured with one or more SCells with configured uplink.

In dual connectivity, however, as the UE is connected to two different eNBs, the UE can be in good coverage of the one cell, e.g., SCG SCell, while in the edge of other cell, e.g., MCG PCell. Then, the UE would experience poor quality of services from the MeNB. If the current MAC specification is simply extended into dual connectivity, TTI bundling is not supported in dual connectivity because SCG SCell is SCells.

Without supporting TTI bundling, in order to increase the uplink coverage of one cell, the UE can increase the transmission power for the data transmission to the corresponding eNB, but this approach might not be desirable or impossible for the UE with dual connectivity because the UE should be able to communicate with multiple cells with limited power. Alternatively, HARQ retransmission at MAC layer or re-segmentation at RLC layer can be used, but it might not be preferred for the real time services due to delay.

Therefore, if the UE with dual connectivity falls into the bad coverage of one eNB and wants real time services from the eNB, TTI bundling needs to be supported towards the eNB in order to increase the uplink coverage of the cells under the eNB. Conventionally, there is no mechanism that the UE uses TTI bundling for one cell when the UE is configured with one or more SCells.

Figure 13:
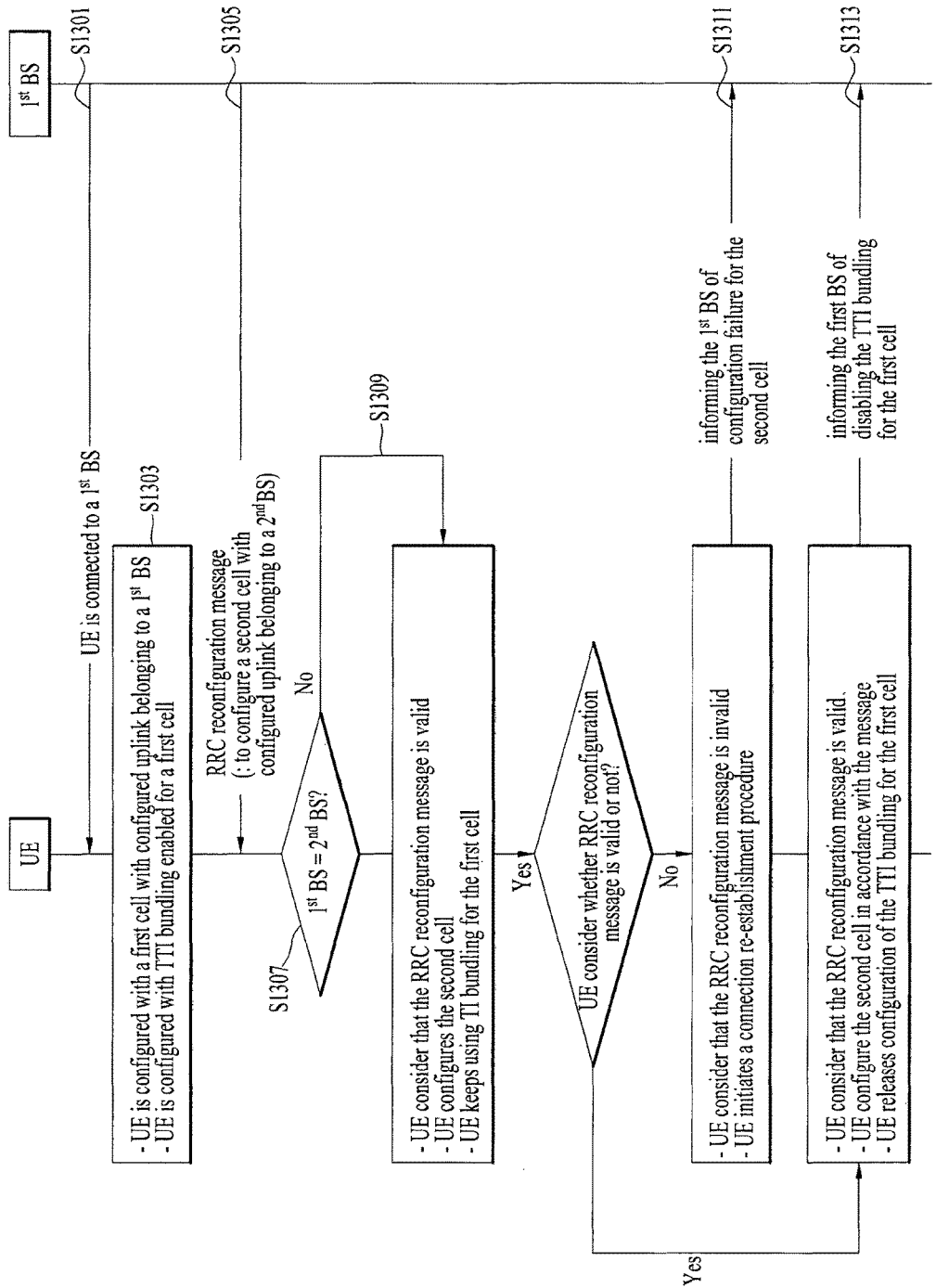

FIG. 13 is a conceptual diagram for configuring TTI bundling at a UE with multiple carriers according to embodiments of the present invention.

In this invention, when the UE is configured with one or more cells with configured uplink, the UE can support TTI bundling for a base station (BS) as long as there is only one cell with configured uplink belonging to the BS.

The UE is connected to a first BS (S1301). The UE is configured with a first cell with configured uplink belonging to the first BS. Also, the UE is configured with TTI (Transmission Time Interval) bundling enabled for the first cell or the first BS (S1303).

Preferably, the first cell can be either a PCell or an SCell. In dual connectivity, the first BS and the second BS can be either the MeNB or the SeNB.

The UE receives a message to configure a second cell with configured uplink belonging to a second BS (S1305).

Preferably, the second cell can be an SCell.

Preferably, the message is an RRCConnectionReconfiguration message. The RRCConnectionReconfiguration message is the command to modify an RRC connection. It may convey information for measurement configuration, mobility control, radio resource configuration (including RBs, MAC main configuration and physical channel configuration) including any associated dedicated NAS information and security configuration. A signaling radio bearer for which the RRCConnectionReconfiguration message is transmitted is SRB 1, a logical channel is DCCH and direction of which the RRCConnectionReconfiguration message is transmitted E-UTRAN to UE.

Preferably, the message can comprise a cell identifier and a BS identifier that indicates to which BS the cell is belonging.

When the UE is configured with a first cell with configured uplink for a first BS and TTI bundling is enabled for the first cell or the first BS, if the UE receives a message from an BS that configures a second cell with configured uplink for a second BS, the UE UE checks whether the first BS and the second BS are the same (S1307).

If the first BS and the second BS are different, the UE considers that the configuration message is valid. The UE configures the second cell for the second BS and the UE keeps using TTI bundling for the first BS (S1309).

If the first BS and the second BS are the same, two cases can be possible. If the UE considers that the RRCConnectionReconfiguration message is invalid, the UE can initiate RRC Connection Reconfiguration procedure and the UE informs the first BS of configuration failure (S1311). Because, if the UE is not able to comply with configuration included in the RRCConnectionReconfiguration message, the UE initiate the connection re-establishment procedure upon which the connection reconfiguration procedure ends.

If the UE considers that the configuration message is valid, the UE configures the second cell for the first BS. And the UE autonomously disables TTI bundling for the first BS and the UE informs the first eNB of disabling TTI bundling for the first BS (S1313).

FIG. 14 is a conceptual diagram for configuring TTI bundling at a UE with multiple carriers according to embodiments of the present invention.

The UE is connected to both a first BS and a second BS (S1401). Of cause, the first BS and the second BS can be same or different each other.

The UE is configured a first cell with configured uplink belonging to a first BS and a second cell with configured uplink belonging to a second BS (S1403).

Preferably, the first cell can be either a PCell or an SCell and the second cell can be an SCell. In dual connectivity, the first BS and the second BS can be either the MeNB or the SeNB.

The UE receives a message configuring TTI (Transmission Time Interval) bundling for the first cell (S1405).

Preferably, the message is an RRCConnectionReconfiguration message. The RRCConnectionReconfiguration message is the command to modify an RRC connection. It may convey information for measurement configuration, mobility control, radio resource configuration (including RBs, MAC main configuration and physical channel configuration) including any associated dedicated NAS information and security configuration. A signaling radio bearer for which the RRCConnectionReconfiguration message is transmitted is SRB 1, a logical channel is DCCH and direction of which the RRCConnectionReconfiguration message is transmitted E-UTRAN to UE.

Preferably, the message can comprise a cell identifier that indicates to which cell configured with TTI bundling enabled or a BS identifier that indicates to with which BS configured with TTI bundling enabled.

When the UE is configured with a first cell with configured uplink for a first BS and TTI bundling is enabled for the first cell or the first BS, if the UE receives a message from an BS that configures TTI bundling for the first cell, the UE checks whether the first BS and the second BS are the same (S1407).

If the first BS and the second BS are different, the UE considers that the RRCConnectionReconfiguration message is valid. The UE configures the TTI bundling for the first cell in accordance with the message (S1409).

If the first BS and the second BS are the same, the UE considers that the RRCConnectionReconfiguration message is invalid, the UE can initiate RRC Connection Re-configuration procedure and the UE informs the first BS of configuration failure (S1411). Because, if the UE is not able to comply with configuration included in the RRCConnectionReconfiguration message, the UE initiate the connection re-establishment procedure upon which the connection reconfiguration procedure ends.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
configuring, by the UE, Transmission Time Interval (TTI) bundling for a first cell with configured uplink belonging to a first base station (BS), when the first cell is only one cell with configured uplink belonging to the first BS;
receiving, by the UE, a message for configuring a second cell with configured uplink belonging to a second BS, after the TTI bundling is configured for the first cell; and
configuring, by the UE, the second cell with configured uplink belonging to the second BS according to the message,
wherein when the second cell with configured uplink belonging to the second BS newly is configured to the UE, the UE determines whether or not to keep the TTI bundling for first cell,
wherein the UE autonomously disables the TTI bundling for the first BS when the message is received, if the first BS and the second BS are same, and
wherein the TTI bundling, that the first cell is configured with, is not disabled, if the first BS and the second BS are different, when the first cell is only one cell with configured uplink belonging to the first BS after the second cell with configured uplink belonging to the second BS is configured to the UE.

2. The method according to claim 1, wherein the message is received from the first BS.

3. The method according to claim 1, wherein the message comprises a cell identifier and a BS identifier that indicates to which BS the cell belongs.

4. The method according to claim 1, further comprising: informing the first BS of disabling the TTI bundling for the first BS.

5. A User Equipment (UE) for operating in a wireless communication system, the UE comprising:
a Radio Frequency (RF) module; and
a processor operably coupled with the RF module and configured to:
configure transmission time interval (TTI) bundling for a first cell with configured uplink belonging to a first base station (BS), when the first cell is only one cell with configured uplink belonging to the first BS,
receive, via the RF module, a message for configuring a second cell with configured uplink belonging to a second BS, and
configure the second cell with configured uplink belonging to the second BS according to the message,
wherein when the second cell with configured uplink belonging to the second BS newly is configured to the UE, the UE determines whether or not to keep the TTI bundling for first cell,
wherein the UE autonomously disables the TTI bundling for the first BS when the message is received, if the first BS and the second BS are same, and
wherein the TTI bundling, that the first cell is configured with, is not disabled, if the first BS and the second BS are different, when the first cell is only one cell with configured uplink belonging to the first BS after the second cell with configured uplink belonging to the second BS is configured to the UE.

6. The UE according to claim 5, wherein the message is received from the first BS.

7. The UE according to claim 5, wherein the message comprises a cell identifier and a BS identifier that indicates to which BS the cell belongs.

8. The UE according to claim 5, wherein the processor is further configured to: inform the first BS of disabling the TTI bundling for the first BS.

* * * * *